Feb. 1, 1955 H. L. CARSON 2,700,895
APPARATUS FOR ULTRASONIC EXAMINATION OF BODIES
Filed March 30, 1950 3 Sheets-Sheet 1

Inventor
Henry L. Carson
By
Attorney

Feb. 1, 1955            H. L. CARSON            2,700,895
APPARATUS FOR ULTRASONIC EXAMINATION OF BODIES
Filed March 30, 1950            3 Sheets-Sheet 2

Inventor
Henry L. Carson
By *Attorney*

INVENTOR
HENRY L. CARSON
BY
ATTORNEY

United States Patent Office 2,700,895
Patented Feb. 1, 1955

2,700,895

APPARATUS FOR ULTRASONIC EXAMINATION OF BODIES

Henry Laird Carson, Greenock, Scotland, assignor to The Babcock & Wilcox Company, New York, N. Y., a corporation of New Jersey Application March 30, 1950, Serial No. 152,841

8 Claims. (Cl. 73—67)

This invention relates to the examination of the interiors of bodies by means of ultrasonic waves. A method at present used for producing a visual representation of a defect within a body depends upon the effect of the wave fronts of ultrasonic waves transmitted through material of the body on a suspension of finely divided metal particles in a suitable liquid. This form of representation is in general unsatisfactory for routine testing, as the particles, unless continually agitated, quickly fall out of suspension. By my invention I enable visual representations of defects within solid bodies to be obtained in an improved manner.

The present invention includes apparatus for examining the interior of a body which effects scanning a surface of the body with ultrasonic vibrations, detecting ultrasonic vibrations transmitted by the body and received at a surface thereof and utilizing received ultrasonic vibrations to effect representation in pictorial form of the internal state of the body or a portion thereof subjected to the vibrations.

The invention also includes apparatus for examining the interior of a body which effects transmitting into the body ultrasonic vibrations at a number of adjacent locations of small area and indicating at corresponding positions of visual image producing means the intensities of the respective vibrations transmitted through or the reflections of the respective vibrations from within the body or a portion thereof.

The invention furthermore includes apparatus for examining the interior of a body which effects sequentially and repeatedly transmitting into the body ultrasonic vibrations at a number of adjacent locations of small area and indicating at corresponding positions on the screen of a cathode ray tube the intensities of the respective vibrations from the said locations transmitted through or the reflection of the respective vibrations from the said locations within the body or a portion thereof.

The invention moreover includes apparatus for examining the interior of a body comprising a transmitter for separately and sequentially applying ultrasonic vibrations to a number of adjacent locations of small area of a surface of a body, a receiver which is adapted to provide an electrical signal bearing a functional relationship to the intensities of vibrations transmitted from the said areas through the body or a portion thereof or to provide an electrical signal indicative of reflection within the body of vibrations from the said areas and visual image producing means capable of response to the said signal.

The invention will now be described, by way of example, with reference to the accompanying drawings, in which.

Figure 1:
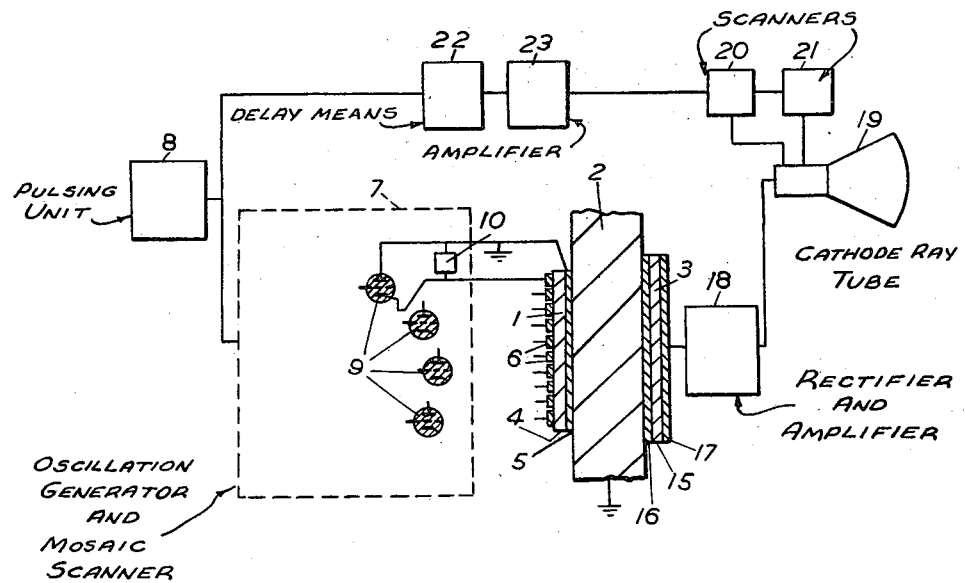
Figure 1 illustrates schematically an arrangement in which ultrasonic vibrations are transmitted from a transmitter at one side to a receiver at the other side of a plate to be examined.
Figure 2:
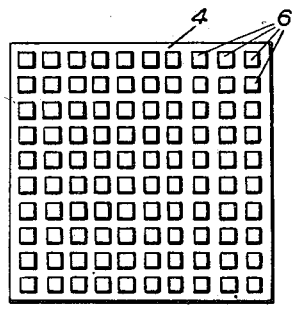
Figure 2 illustrates a face of a piezo-electric transmitter plate showing conductive material at 100 small discrete areas.

Referring to Figures 1 and 2 of the drawings, a transmitter 1 of ultrasonic vibrations to the metal of a plate 2 whose soundness is to be investigated, for example a mild steel plate, and a receiver 3 of ultrasonic vibrations are arranged at opposite faces of the plate at a region thereof to be examined for defects.

The transmitter 1 comprises a plate 4 of piezo-electric material which has on its face adjacent to the plate 2 an electrically conductive coating 5 formed by metallizing the face, and on its opposite face electrically conductive material on 100 small adjacent discrete areas 6 arranged in regular fashion in ten evenly spaced parallel rows of one direction and ten evenly spaced parallel rows at right angles thereto, the areas being squares of the same size (for example of side 2.5 mm.) and equally spaced from one another (for example with a space of 2.5 mm. between adjacent squares) on all sides (Figure 2). The arrangement forms a mosaic of piezo-electric elements, each of which is capable of transmitting ultrasonic vibrations into the plate 2 when the transmitter is pressed against a face of the plate by suitable means (not shown), usually with the employment of transformer oil or, preferably, tin amalgam at the junction between the coating 5 and the plate 2 to secure good acoustical transmission, and when the element is excited by the application between the coating 5 and the appropriate metallized area 6 of an oscillating electric potential difference of a frequency adapted to set the appropriate portion of the piezo-electric plate into vibration.

The elements of the mosaic are arranged to be excited sequentially by an oscillation generator and mosaic scanner 7 which operates upon the receipt of impulses from a timing unit 8. The timing unit consists of a suitable circuit or circuits arranged to generate an electrical impulse periodically; for example, a potential difference having a saw-tooth wave form of frequency up to 10,000 cycles per second is generated by a relaxation oscillatory circuit including a thyratron electron tube. The electrical impulses from the timing unit 8 are led to the oscillation generator and mosaic scanner 7, in which each impulse is arranged to excite the piezo-electric element next in an endless cycle of all the elements. Suitably, as in the known Wynn-Williams ring circuit (as referred to by C. E. Wynn-Williams, "The use of thyratrons for high speed automatic counting of physical phenomena," Proceedings of the Royal Society "A," No. 132 (July 1931), pp. 295-309, and C. C. Schumard, "Some electronic switching circuits," Electrical Engineering (American), No. 57 (May 1938), pp. 209-220), thyratrons (grid controlled hot cathode arc discharge tubes) to the number in the present case of 100 are so arranged that only one is permitted to be conductive at a time, while an electrical impulse from the timing unit is effective to cause the next thyratron in an endless cycle to be the sole conductive thyratron. In the oscillation generator and mosaic scanner, the thyratrons 9 are associated respectively with the piezo-electric elements of the mosaic, the anodes being connected together and to the conductive coating 5, which is grounded and the cathodes to the respective metallized areas 6, and each thyratron if conductive completes a respective oscillatory circuit including an electrically resonant unit 10 and the associated piezo-electric element. Whenever in its turn a thyratron is rendered conductive there is a surge of current which excites the respective oscillatory circuit, which is tuned to the fundamental frequency of the piezo-electric element and which sustains electric oscillations resulting in the transmission across the plate 2 of ultrasonic waves of a suitable frequency, for example 2.5 megacycles per second. The order in which the elements are excited is suitably a regular line by line scan as in the reading of a page of printed matter.

The receiver 3 comprises a plate 15 of piezo-electric material which has on opposite faces respective electrically conductive coatings 16 and 17 formed by metallizing the surfaces. When the receiver is pressed by suitable means (not shown) against the face of the plate 2 opposite to the transmitter 1, usually with the employment of oil or amalgam to secure good acoustical transmission, and a train of ultrasonic vibrations is transmitted through the plate 2, an oscillating potential difference is generated between the coatings 16 and 17, from which it is led to an amplifier and rectifier 18 and then arranged to control the intensity of the electron beam of a cathode ray tube 19 in such a way that the greater the intensity of the received ultrasonic vibrations the higher the illumination at the position on the screen to which the electron beam is directed.

The impulses from the timing unit are arranged by suitable means to effect scanning of the cathode ray tube screen in correspondence with the sequential excitations of the piezo-electric elements. In Figure 1 a first scanning deflector 20 and a second scanning deflector 21 are indicated. The first scanning deflector 20 suitably includes ten thyratrons permitted to be conductive only one at a time, to be rendered conductive in turn in an endless cycle upon the reception of impulses from the timing unit 8, and each controlling the operation of a respective pentode adapted when conductive to position the electron beam by control of one pair of the deflecting plates of the cathode ray tube. The arrangement is such that the electron beam in illuminating successive positions on the screen travels in one direction from one of its extreme positions to the other and then recommences the sequence at the first extreme position. With the thyratron whose conductivity effects this last movement of the electron beam is associated means for transferring an electrical impulse to the second scanning deflector 21, which similarly suitably includes ten thyratrons arranged to position the electron beam by means of respective pentodes controlling the other pair of deflecting plates of the cathode ray tube and arranged to effect scanning similar, but at right angles, to that effected by the first scanning deflector 20. The positions on the screen to which the electron beam is directed during the scanning form an array and it is arranged that the excitation of a piezo-electric element in the mosaic effects illumination of a corresponding position in the array.

Figure 5:
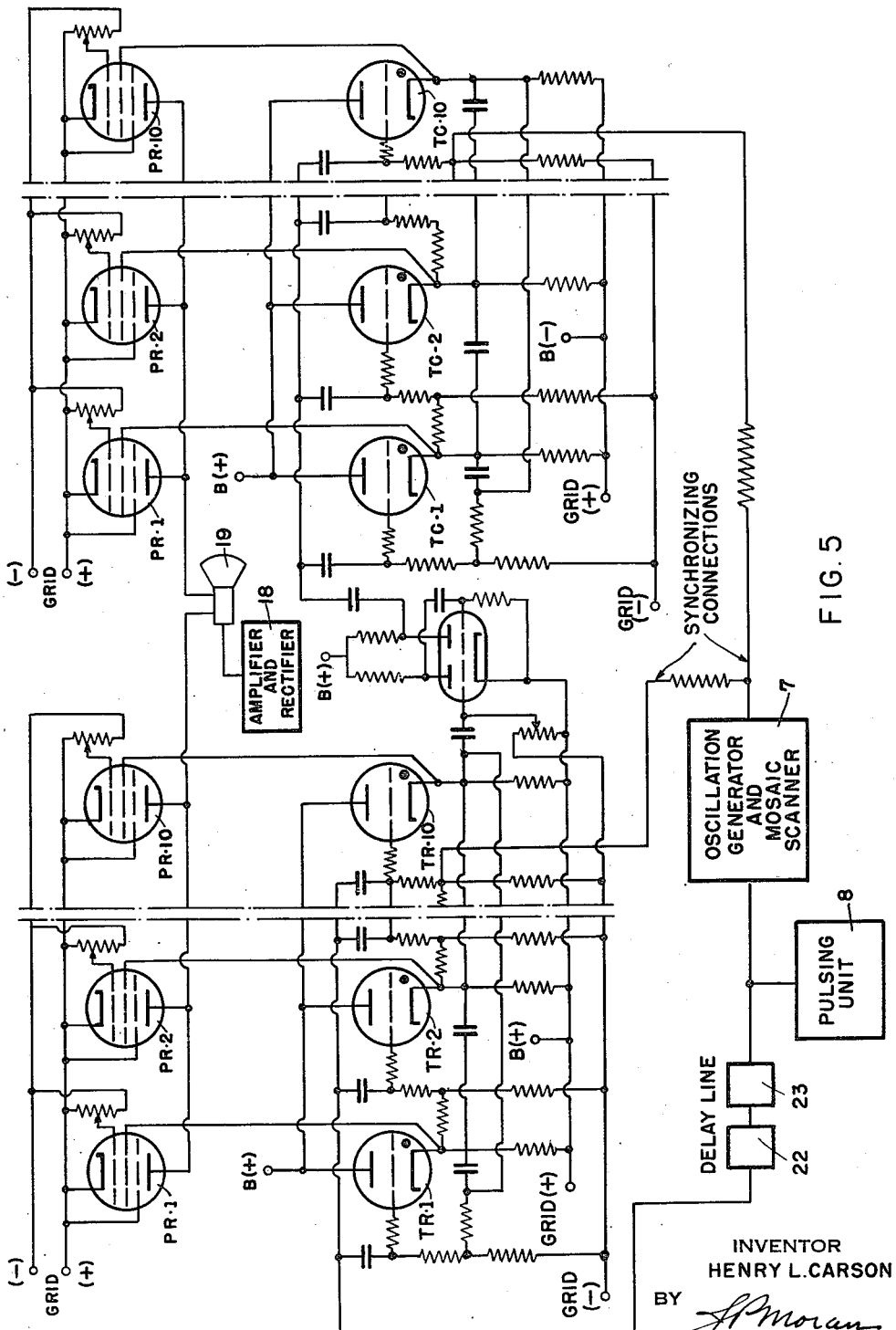
Fig. 5 is a partial schematic diagram of the electronic circuits of the scanning system.

In order to fully describe how the scanning system operates, it will be assumed that the cathode ray tube screen is a square divided into 100 positions comprised of 10 columns each having 10 rows therein, the columns extending vertically and the rows horizontally. Referring to Fig. 5, a thyratron controlled pentode P$r$ is provided for each row, there thus being 10 "row" pentodes, and a thyratron controlled pentode P$c$ is provided for each column there thus being 10 "column" pentodes. The "row" pentodes are associated with the first scanning deflector 20 and the "column" pentodes are associated with the second scanning deflector 21. Each row pentode has a different voltage applied to it of such value that it will deflect the cathode ray to the proper vertical position on the screen, the different voltages of the row pentodes being so selected that, as each successive row pentode is energized, the ray will be deflected to the next successive vertical position on the screen. Similarly, different voltages are applied, in stepped relation, to each of the column pentodes so that, as the column pentodes are successively energized, the cathode ray will be transferred to successive horizontal positions on the screen.

Assuming that the scanning is from left to right in successive rows and moves downwardly over the screen face, the first row pentode P$r$–1 is energized by virtue of a pulse received from the timing unit by its controlling thyratron T$r$–1, this pulse being the same which properly positions the scanning unit for applying ultrasonic vibrations by the transmitter. This first pentode remains conductive during the time that each of the column pentodes P$c$ are successively and momentarily rendered conductive by their respective thyratrons T$c$, also in response to the pulses sent out by timer 8. The "right hand end" thyratron T$r$–10 of the horizontal or column scan system is arranged, when energized, to pass a pulse to the vertical or row thyratron scan system to switch the pentode energization from the first row pentode P$r$–1 to the second row pentode P$r$–2. The latter remains conductive while each of the column pentodes are again successively and momentarily energized to sweep the cathode ray horizontally of the screen and at the second row position. This operation is cyclically repeated, with the last column thyratron T$c$–10 controlling the lower right hand position delivering a trigger pulse to the first row thyratron T$r$–1 controlling the uppermost position of the cathode ray. In the typical example chosen, the cathode ray is thus swept from left to right in a horizontal line at each of 10 successive levels from the top to the bottom of the screen and this sweeping is cyclically repeated.

Figure 3:
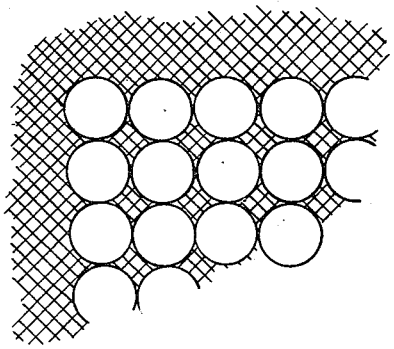
Figure 3 illustrates part of an array of illuminated positions on the screen of a cathode ray tube.

During operation, the action of the timing unit 8 and the oscillation generating and mosaic scanner 7 is to cause the face of the plate 2 beneath the mosaic of piezo-electric elements to be scanned by ultrasonic vibrations, and the trains of ultrasonic vibrations from the elements of the mosaic are projected into the body of the plate. The arrival of ultrasonic vibrations from a piezo-electric element at the receiver 3 is indicated by the illumination of a position on the screen having the same relative position in the whole array as the position of the piezo-electric element in the mosaic. An internal defect in the plate lying in the path of an ultrasonic vibration train from a piezo-electric element will at least reduce the intensity of the ultrasonic vibration arriving at the receiver, resulting in a dark or at least less brightly illuminated position in the array on the screen, on which, therefore, a pictorial representation of the interior of a region of the plate is shown. The size of the cathode spot relative to the size of the array on the screen may be adjusted so that the illuminations of adjacent positions in the array just touch (Figure 3).

Ultrasonic waves from a given crystal element are generated when the associated thyratron ultrasonic generator becomes conducting. Simultaneously, the cathode ray tube spot is positioned by electrical means and can remain in this position only for the duration of the conducting period of the positioning thyratron, which is the same as the conducting period of the ultrasonic generating thyratron. Thus, when a particular ultrasonic generating thyratron is nearing the end of its conducting period it may still be giving rise to ultrasonic waves. At the end of the conducting period of the ultrasonic generating thyratron, the spot moves to its next position and after it has done so, since ultrasonic waves travel much slower than electrical impulses, the ultrasonic pulses generated just prior to the extinction of the generating thyratron will be received and will therefore tend to brighten up the new spot position, whereas they are really part of the previous spot position brightening. Thus, if a suitable delay were introduced into the spot positioning circuit matters could be so arranged that the change in spot position at the cathode ray tube could be delayed until all ultrasonic energy intended to brighten it had been given time to traverse the material.

While small overlaps of, for example, 1% can be tolerated, large overlaps which might occur with relatively thick plates must be avoided. This may be done by delaying the arrival of the timing pulses to the scanning systems 20 and 21 by an adjustable delay line including delay means 22 and an amplifier 23. The delay means 22 may be of the type in which ultrasonic vibrations are passed along a mercury column, and the amplifier 23 strengthens the delay pulses.

Figure 4:
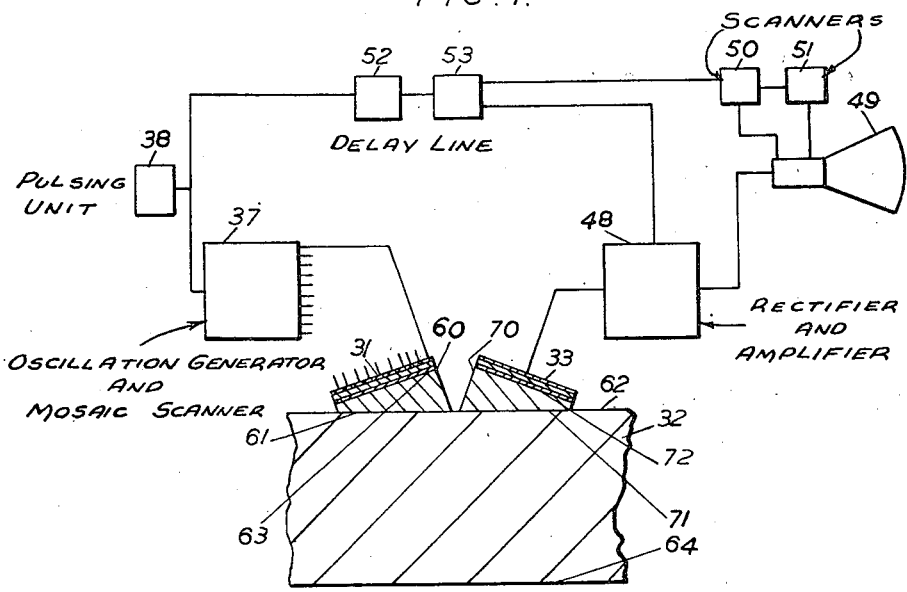
Figure 4 illustrates schematically an arrangement in which a transmitter and receiver of ultrasonic vibrations are disposed on the same side of a plate to be tested.

Referring to Figure 4, ultrasonic vibrations are generated in the manner described with reference to Figures 1 and 2 by a transmitter 31 similar to the transmitter 1 consisting of a mosaic of piezo-electric elements, and an oscillation generator and mosaic scanner 37 similar to the oscillation generator and mosaic scanner 7, but the vibrations are transmitted to the plate 32, of which the interior is to be examined, via a wedge-shaped member 60 of similar material to the plate 32. The wedge-shaped member is formed with a face 61 which is designed to be pressed against a face 62 of the plate 32, usually with the employment of oil or amalgam to secure good acoustical transmission, and another face 63, at an angle thereto, against which the transmitter is designed to be pressed. The paths of the trains of vibrations from the piezo-electric elements transmitted into the plate make an angle with the face 62 and ultrasonic vibrations reflected from the opposite face 64 of the plate enter a further wedge-shaped member 70 pressed against the face 62 to the appropriate side of and at a suitable distance from the wedge-shaped member 60. The further wedge-shaped member 70 is formed with a face 71 designed to be pressed against the face 62 of the plate, with the employment of oil or amalgam to secure good acoustical transmission, and a face 72 against which a receiver 33, similar to the receiver 3, is designed to be pressed and which is at an angle to the face 62 so that the path lengths of the trains of vibrations from all the piezo-electric elements of the transmitter 31 to the receiver 33 are the same. The oscillating potential difference generated by the receiver 33 is led to an amplifier and rectifier 48, and the impulses there-from are arranged to vary illumination of positions in an array of positions on the screen of a cathode ray tube 49 in accordance with the intensity of the received ultrasonic vibrations.

The electron beam is scanned in the manner described with reference to Figures 1 and 2 by impulses originating with the timing unit 38 and effecting scanning movements in two directions at right angles by operating scanning deflectors 50 and 51.

An internal defect in the plate 32 in the region traversed by the ultrasonic vibrations will give rise to reflected vibrations of which some may arrive at the receiver 33, and to facilitate discrimination between the reception of vibrations reflected from such a defect and vibrations reflected from the face 64, the vibration trains generated by the oscillation generator and mosaic scanner are arranged to have durations short compared with the interval between the commencements of successive vibration trains, the impulses from the timing unit destined to be applied to the scanning deflectors 50 and 51 are delayed by adjustable delay means 52 and amplifier 53 similar to the delay means 22 and amplifier 23 referred to in connection with Figure 1, and the amplifier and rectifier 48 is controlled by suitable means by delayed impulses from the delay means so as to be inoperative to influence the electron beam to effect illumination of a position on the screen except for a short period immediately following the reception of each delayed impulse from the delay means.

The control of the amplifier and rectifier 48 may be as follows. The impulses from timing unit 48, which initiates the appropriate ultrasonic thyratron, is also fed to a thermionic valve circuit. This circuit might conveniently take the form of a cathode coupled multi-vibrator and be such that for a predetermined time after the initiating pulse has been received by the delay circuit, it supplies a positive pulse to the unit 48. This latter is normally in an insensitive condition, and only becomes sensitive upon receipt of the positive pulse. After a time delay dependent upon the circuit constants of the delay circuit, the positive pulse ceases to be produced and the amplifier-rectifier unit 48 reverts to its insensitive condition.

Should the duration of each vibration train be desired to be shorter than the de-ionisation time of thyratrons will permit, the thyratron ring circuit of the oscillation generator and mosaic scanner 37 may be replaced by vacuum tube pulse generators.

In the operation of this arrangement, should a delay in the desensitizing of the amplifier-rectifier unit 48 be effected which corresponds to the path length of ultrasonic vibrations reflected from the plate face 64, all the positions in the array on the screen will be illuminated if the plate is free of defects, but a defect in the path of a train of vibrations from a piezo-electric element will result in at least a reduction of the illumination of the position in the array corresponding to the element. Adjustments of the sensitivity period of the amplifier-rectifier unit 48 to effect shorter periods of sensitivity will result in an unilluminated screen if the plate is free of defects, but the illumination of one or more positions on the screen when the sensitivity period has been reduced will indicate the reflection of vibrations from the corresponding element or elements of the transmitter by a defect in the path of vibrations from the corresponding piezo-electric element or elements whose distance from the plate face 64 is measured by the amount by which the delay has been reduced.

The following typical example will facilitate an understanding of the foregoing.

Electrical pulses are applied from the circuits contained within 37 to each element of the multielement crystal 31 in the normal sequence. The time between these pulses, which is the same as the duration of an ultrasonic wave train radiated from a given element of the multielement crystal, is governed by the timing unit 38. If the amplifier-rectifier unit 48 is sensitive for a time sufficient for at least the initial part of an ultrasonic pulse to pass from surface 63 via surface 64 to surface 72, then, assuming the material 32 to be free of defects, the amplifier-rectifier unit will be sensitive to all ultrasonic pulses following this path. (As this is the longest possible direct path it will also be sensitive to all waves arriving by other paths as in the case of defects being present.)

For sake of example, if the repetition frequency of the timing unit 38 is "$p$" per second, then the time between consecutive timing pulses is given by $$\frac{10^6}{p}$$

microseconds. If the vertical distance between surfaces 62 and 64 is "$x$" inches, and the angle of inclination of the wedge shaped members 60 and 70 to the surface 62 is $\theta$, and it is assumed that an ultrasonic pulse originates from a point on surface 63, vertical height "$y$" inches above surface 62, then the ultrasonic path length for this pulse passing through the test plate 32, being reflected from surface 64 and arriving at the mid position of surface 72 is given by $$2\left(\frac{x}{\cos \theta}+y \cos \theta\right) \text{ inches}$$

If "$c$" inches per second is the velocity of ultrasonic waves in the material, then the time taken for the ultrasonic pulse to pass from the transmitting crystal element to the receiving crystal is given by $$\frac{2 \times 10^6}{c}\left(\frac{x}{\cos \theta}+y \cos \theta\right) \text{ microseconds}$$

If the wedges and test specimen be considered to be composed of steel, and the following values be assumed, $x=1$ inch; $y=0.25$ inch; $\theta=30°$; $c=2 \times 10^5$ inches per second, then the time taken by an ultrasonic pulse to traverse the path discussed above is $$\frac{2 \times 10^6}{2 \times 10^5}\left(\frac{1}{\sqrt{3/2}}+\frac{0.25\sqrt{3}}{2}\right) \text{ microseconds}=$$

$$10(1.154+0.2165)=13.7 \text{ microseconds}$$

If $p=5000$ cycles per second, then the duration of each complete ultrasonic wave train is 200 microseconds.

Hence, in this example with the pulse repetition frequency selected the ultrasonic pulse is of more than adequate duration, and the bottom echo will just show-up on the cathode ray tube screen when the electronic delay circuit associated with the amplifier-rectifier unit is arranged to sensitize the amplifier-rectifier unit for 13.7 microseconds after the generation of each ultrasonic pulse at the transmitting crystal 31.

If it is now desired to investigate defects lying between surface 62 and midway down the thickness of the test plate 32, then the delay circuit must be adjusted to sensitize the amplifier-rectifier unit 48 for a time given by:

$$\frac{2 \times 10^6}{2 \times 10^5}\left(\frac{0.5}{\sqrt{3/2}}+\frac{0.25\sqrt{3}}{2}\right) \text{ microseconds}$$

after the generation of each ultrasonic pulse, i. e.

$$10(0.577+0.2165)=7.93 \text{ microseconds}$$

If in the arrangements described, it is desired to arrange for a very high repetition rate of pulses from the timing unit 8 or 38, as for example in order to arrange for a high frequency of repetition of the pictorial representations on the screen or to scan at a high rate a mosiac of very numerous elements, vacuum electron tubes and not thyratrons may be used in the timing units 8 and 38 (as in the arrangement devised by O. S. Puckle and described in "The Journal of the Television Society," 1936, No. 2, page 147) as well as if necessary in the oscillation generators and mosaic scanners 7 and 37 and the scanning deflectors 20 and 21 and 50 and 51.

In the arrangements described the cathode ray tube, on whose screen a representation of the interior of the plate is depicted, may be placed at any convenient position, while the arrangements do not require the positioning adjacent to the plate of apparatus bulky or requiring particular care in handling since the transmitter and the receiver are compact and may be robustly mounted.

I claim:

1. Apparatus for examining the interior of a body comprising, in combination, an electrically excited ultrasonic vibration transmitter, having a first surface engageable with a first surface area of the body, and a second surface parallel to said first surface and divided into a mosaic of discrete vibration transmitting areas; an ultrasonically excited electric potential generating receiver having a surface, substantially congruent to such transmitter surface, engageable with a body surface area spaced from said first surface area to receive ultrasonic vibrations transmitted through the body from such discrete transmitting areas and generate electric potentials corresponding to the respective intensities of the transmitted vibrations; electric potential excited visual image producing means connected to said receiver to be activated by potentials produced by said receiver and having a viewing surface of which the image intensity is a function of the received potentials; first scanning means arranged to scan said transmitting areas with exciting potentials; second scanning means arranged to scan said viewing surface in synchronism with the scanning of said discrete transmitting areas; and a scanner driving means connected to both said scanning means to drive the same in synchronism with each other.

2. Apparatus as claimed in claim 1 in which said transmitter comprises a piezo-electric crystal having a conductive layer on said first surface and a plurality of discrete conductive surfaces arranged in a mosaic on said second surface.

3. Apparatus as claimed in claim 1 in which said receiver comprises a piezo-electric crystal.

4. Apparatus as claimed in claim 1 in which said transmitter comprises a piezo-electric crystal having a conductive layer on said first surface and a plurality of discrete conductive surfaces arranged in a mosaic on said second surface; and said receiver comprises a piezo-electric crystal.

5. Apparatus as claimed in claim 1 in which said image producing means comprises a cathode ray tube.

6. Apparatus as claimed in claim 1 in which said transmitter comprises a piezo-electric crystal having a conductive layer on said first surface and a plurality of discrete conductive surfaces arranged in a mosaic on said second surface; and said first scanning means comprises a plurality of electric valves, and a plurality of electric resonators, each valve being connected, in series with a resonator, to one of said discrete conductive surfaces.

7. Apparatus as claimed in claim 1 in which said transmitter comprises a piezo-electric crystal having a conductive layer on said first surface and a plurality of discrete conductive surfaces arranged in a mosaic on said second surface; said receiver comprises a piezo-electric crystal; said image producing means comprises a cathode ray tube; said first scanning means comprises a plurality of electric valves, and a plurality of electric resonators; each valve being connected, in series with a resonator, to one of said discrete conductive surfaces; said second scanning means includes two pairs of perpendicularly related beam deflecting plates mounted in said tube and two series of sequential operable, momentary pulse excited space discharge devices each connected to a different pair of deflecting plates; each sequentially operable device of one of said series being operable during sequential operation of a different sequential group of devices of the other series, and the electric valves of both series being connected for sequential momentary excitation in an endless cycle; and said driving means comprises a pulse generator connected in parallel to said first and second scanning means.

8. Apparatus as claimed in claim 1 in which said transmitter comprises a piezo-electric crystal having a conductive layer on said first surface and a plurality of discrete conductive surfaces arranged in a mosaic on said second surface; said receiver comprises a piezo-electric crystal; said image producing means comprises a cathode ray tube; said first scanning means comprises a plurality of electric valves, and a plurality of electric resonators; each valve being connected, in series with a resonator, to one of said discrete conductive surfaces; said second scanning means includes two pairs of perpendicularly related beam deflecting plates mounted in said tube and two series of sequential operable, momentary pulse excited space discharge devices each connected to a different pair of deflecting plates; each sequentially operable device of one of said series being operable during sequential operation of a different sequential group of devices of the other series, and the electric valves of both series being connected for sequential momentary excitation in an endless cycle; said driving means comprises a pulse generator connected in parallel to said first and second scanning means; and pulse delay means connected between said driving means and said space discharge devices.

References Cited in the file of this patent

UNITED STATES PATENTS

| | | |
|---|---|---|
| 2,093,157 | Nakashima et al. | Sept. 14, 1937 |
| 2,164,125 | Sokoloff | June 27, 1939 |
| 2,453,502 | Dimmick | Nov. 9, 1948 |
| 2,463,328 | Sproule | Mar. 1, 1949 |
| 2,489,860 | Carlin | Nov. 29, 1949 |
| 2,528,725 | Rines | Nov. 7, 1950 |
| 2,528,730 | Rines | Nov. 7, 1950 |

FOREIGN PATENTS

| | | |
|---|---|---|
| 477,139 | Great Britain | Dec. 22, 1937 |